CHARLES GOOCH.
Improvement in Machines for Manufacturing Ice-Cream.
No. 126,691. Patented May 14, 1872.
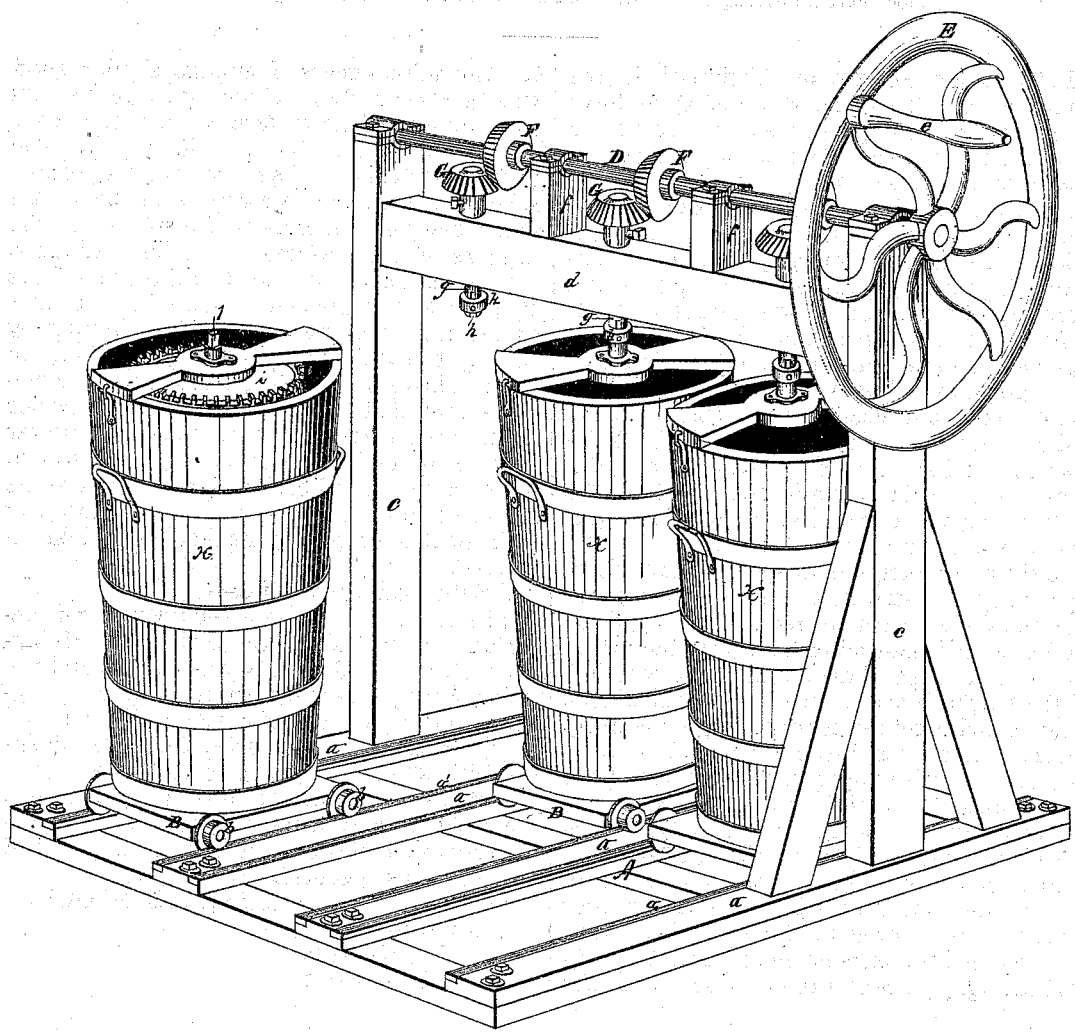

UNITED STATES PATENT OFFICE.

CHARLES GOOCH, OF CINCINNATI, OHIO.

IMPROVEMENT IN MACHINES FOR MANUFACTURING ICE-CREAM.

Specification forming part of Letters Patent No. 126,691, dated May 14, 1872.

I, CHARLES GOOCH, of Cincinnati, in the county of Hamilton and State of Ohio, have invented certain Improved Apparatus for the Manufacture of Ice-Cream, of which the following is a specification:

My invention is an apparatus designed to be used in manufacturing ice-cream in large quantities, and is adapted to the production of different flavors and qualities of the article in a more expeditious manner than heretofore. It consists of an arrangement of a horizontal driving-shaft in such relation to a series of vertical driving-shafts and parallel horizontal ways, on which the cream-receptacles are moved up to and away from the said vertical shafts, to allow their dasher stems to be coupled therewith, so as to adapt said driving-shaft to operate the dasher singly and successively, or simultaneously, as hereinafter described.

In the accompanying perspective drawing of my improved ice-cream machine, the bed-frame A is composed of transverse timbers, to which are bolted the rail-timbers $a$, having the metallic corner-facings $a'$ upon which the wheels $b$ of the trucks B are moved. Two uprights, $c$ $c$, connected together near their upper ends by the framing-timber $d$, are connected, in a secure manner, with the outer rail-timbers of the bed-frame A, to which they are perpendicular. On the top of each post or upright $c$ $c$ are boxes in which is journaled the driving-shaft D, to one end of which is secured the balance-wheel and crank-pin or handle E and $e$. Miter-gear wheels F are secured to the shaft D at intervals between its extreme ends, and intermediate bearings $f f$ are secured to the cross-timber $b$. The miter-gears F engage similar gear-wheels G secured to the ends of upright shafts $g$, which extend downward through the cross-timber $b$, in which they are journaled. The lower ends of the shafts $g$ have a square recess, $h$, let into them for the reception of the square and corresponding ends of the stems 1 of the dashers of the ice-cream freezers. Rings $k$, loosely fitting and confined to the ends of the shafts $g$, secure the connection of the stems 1 of the ice-cream freezer and the shafts $g$ by sliding it down over the recesses $h$, when the stems 1 have been entered therein. The machine may be large enough to operate two or six ice-cream freezers at one time, and power may be applied in place of using the winch. When a number of variously-seasoned creams are to be frozen it may be done expeditiously in freezers operated by the machine herein described.

I claim as my invention—

The improved ice-cream apparatus herein described, composed of the horizontal driving-shaft D, provided with bevel-gears F, and the vertical supplementary driving and coupling-shafts $g$ carrying the gears G, both mounted in the frame $c$ $c$ $d$, as shown, the rotary dashers with stems $f$ adapted to couple with the shafts $g$, the cylindrical tubs or receptacles $x$ mounted on the wheeled trucks B, and the parallel ways $a$ $a$ on the bed-frame A, all arranged to operate as specified.

CHARLES GOOCH.

Witnesses:
H. P. LLOYD,
C. L. FISHER.